United States Patent [19]

Sakurai

[11] Patent Number: 5,093,779
[45] Date of Patent: Mar. 3, 1992

[54] COMPUTER FILE SYSTEM

[75] Inventor: Naoki Sakurai, Yokohama, Japan

[73] Assignee: Hitachi, Ltd., Tokyo, Japan

[21] Appl. No.: 214,461

[22] Filed: Jul. 1, 1988

[30] Foreign Application Priority Data

Jul. 3, 1987 [JP] Japan .................. 62-165301

[51] Int. Cl.$^5$ .................................. G06F 15/40
[52] U.S. Cl. ........................ 395/600; 364/282.1;
364/283.1; 364/282.3; 364/DIG. 1
[58] Field of Search ... 364/200 MS File, 900 MS File;
369/59

[56] References Cited

U.S. PATENT DOCUMENTS

| | | | |
|---|---|---|---|
| 4,775,969 | 10/1988 | Osterlund | 369/53 |
| 4,782,442 | 11/1988 | Kojima et al. | 364/200 |
| 4,791,623 | 12/1988 | Deiotte | 369/59 |
| 4,792,937 | 12/1988 | Picard | 369/59 |
| 4,831,541 | 5/1989 | Eshel | 364/200 |
| 4,839,802 | 6/1989 | Wonak et al. | 364/200 |
| 4,849,878 | 7/1989 | Roy | 364/200 |
| 4,864,497 | 9/1989 | Lowry et al. | 364/300 |
| 4,914,569 | 4/1990 | Levine et al. | 364/200 |
| 4,945,475 | 7/1990 | Bruffey et al. | 364/200 |

Primary Examiner—Gareth D. Shaw
Assistant Examiner—M. Napiorkowski
Attorney, Agent, or Firm—Antonelli, Terry Stout & Kraus

[57] ABSTRACT

A computer file system, in which directory files and real files are organized in a tree structure, includes data items which are recorded in a high-ranking directory file in the tree structure, a high-ranking file management table which records file management data indicative of the assignment relation with low-ranking directory files or real files created below the high-ranking directory file, and a low-ranking file management data which is stored in any of the low-ranking directory files and indicative of the assignment relation between the low-ranking directory file and other low-ranking directory files or real files. The system further includes an assignment relation copy device which copies the file management data of a high-ranking or low-ranking file management table indicative of the assignment relation between the high-ranking or low-ranking directory files or real files into another high-ranking or low-ranking file management table.

13 Claims, 8 Drawing Sheets

FIG. 2

| FILE NAME (DIRECTORY) | ATTRIBUTE | CREATION DATE/TIME | INDEX | FILE SIZE |
|---|---|---|---|---|
| FiLE 01 | f | 62.3.1.8 | 0001 | 200 |
| FiLE 02 | f | 62.3.3.10 | 0005 | 100 |
| diR 01 | d | 62.4.5.13 | 0015 | 0 |
| diR 02 | d | 62.4.5.18 | 0017 | 0 |
| FiLE 03 | | 62.5.12.14 | 0018 | 12560 |
| | | | | |

FIG. 3

| | | | |
|---|---|---|---|
| 0001 | 002 | FiLE 01 MAIN BODY, PART 1 | |
| 0002 | 003 | FiLE 01 MAIN BODY, PART 2 | |
| 0003 | END | FiLE 01 MAIN BODY, PART 3 | |
| 0004 | | | |
| 0005 | 006 | FiLE 02 MAIN BODY, PART 1 | |
| 0006 | END | FiLE 02 MAIN BODY, PART 2 | |
| 0007 | | | |
| 0008 | | | |
| 0015 | END | diR 01 MAIN BODY, PART 1 | |
| 0016 | | | |
| 0017 | END | diR 02 MAIN BODY, PART 1 | |
| 0018 | 097 | FiLE 03 MAIN BODY, PART 1 | |
| 0019 | | | |
| 0197 | 198 | FiLE 03 MAIN BODY, PART 2 | |
| 0198 | 120 | FiLE 03 MAIN BODY, PART 3 | |

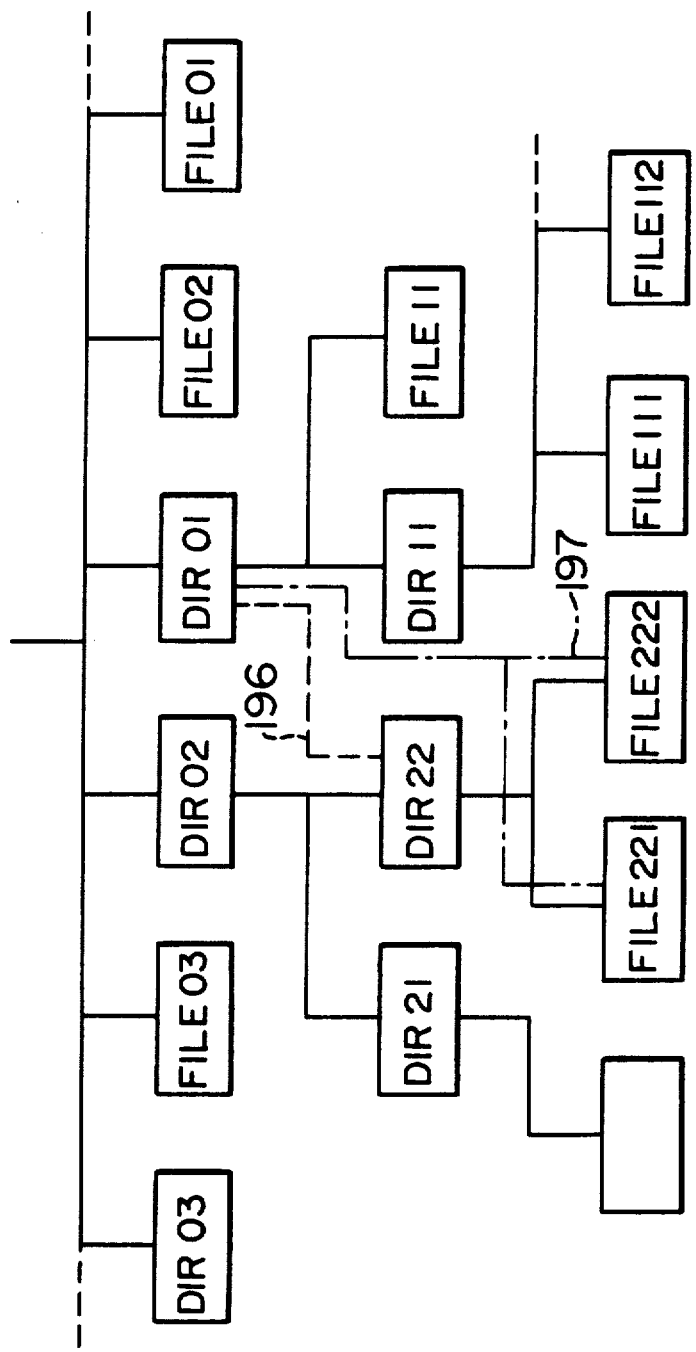
F I G. 5

```
¥DIR02¥DIR22¥FILE221 = ¥DIR01¥FILE221
¥DIR02¥DIR22¥FILE222 = ¥DIR01¥FILE222
      ⋮
END
```

_5,093,779_

COMPUTER FILE SYSTEM

BACKGROUND OF THE INVENTION

This invention relates to a computer file system and, more particularly, to a method of re-organizing a computer file system suitable for tree-structure management of directory files and real files.

A prevalent computer file management system is based on a tree structure in which a higher-order directory includes lower-order directories and/or real files. In such a computer file management system, the tree structure of directory files and real files can be re-organized by copying necessary directory files and/or real files into a new directory file. However, this method requires the actual movement of directory files and real files in the storage (storage medium), and this awkward system operating technique is deemed to be improved.

Tree-structure computer file systems relevant to this subject are disclosed, for example, in Japanese Patent Unexamined Publication Nos. 59-95648 and 61-141035.

The above-mentioned conventional technique, in which re-organization of directory files is accompanied by the actual movement of real files in the storage, not only imposes an intricate and time-consuming operation, but requires a sufficient vacant area in the storage for the movement of real files.

SUMMARY OF THE INVENTION

An object of this invention is to provide a computer file system, which enables the operator to reorganize the directory or file structure through a simpler operation.

The above objective is achieved by the computer file system, in which directory files and real files are under tree structure management, comprising a high-order file management table which is stored in a high-order directory file located in a high-order position in the tree structure and used to store file management data indicative of the assignment relation between data items written in the high-order directory file and low-order directory files or real files created below the high-order directory file, and low-order file management data which is stored in any of the low-order directory files and used to store file management data indicative of the assignment relation between the low-order directory file and other low-order directory files or real files, wherein the system further comprises an assignment relation copy means which copies the file management data in high-order or low-order file management tables indicative of the assignment relation among the high-order or low-order directory files or real files into other high-order or low-order file management tables.

The assignment relation copy means copies the file management data in file management tables indicative of the assignment relation of directory files or real files necessary for re-organization into other file management tables. After the file management data has been copied, the system not only allows the access to directory files or real files in accordance with the directory structure before copy, but also allows the access to directory files or real files in accordance with the copied file management data. Consequently, the inventive system is operative to add a new directory structure, while retaining the former directory structure, without being accompanied by the actual movement of directory files and real files.

BRIEF DESCRIPTION OF THE DRAWINGS

FIG. 2 is a diagram showing the arrangement of a file management table;

FIG. 3 is a diagram showing the arrangement of the data block management table;

FIG. 5 is a diagram showing the tree structure of the directory files and real files;

DESCRIPTION OF THE PREFERRED EMBODIMENTS

Figure 1:
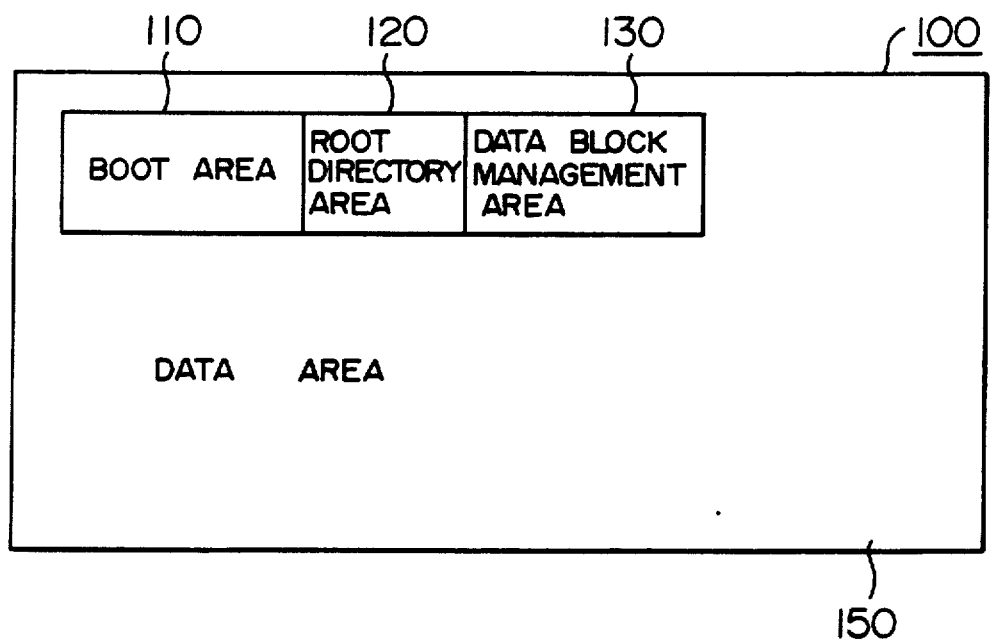
FIG. 1 is a diagram showing the assignment of areas in the storage of a computer to which the inventive file system is applied.

Before entering into the details of this invention, an example of the tree-structure file system will be briefed. In FIG. 1, a computer system has a storage area 100, in which are included a boot area 110 for storing data used for automatic execution of a program, a root directory area 120 for storing a file management table in which file management data of the highest-order directory file (will be termed "root directory") is recorded, a data block management area 130 for storing area allotment affairs of low-order directories (will be termed "subdirectories") and files created below the root directory, and a data area 150 for storing subdirectories and real files. The boot area 110, root directory area 120 and data block management area 130 are generally placed in predetermined locations within the storage area 100.

FIG. 2 shows the details of the file management table 129 stored in the root directory area 120. The table 129 comprises a file name field 121 for recording the name of real files (directory files), an attribute field 122 for recording the attribute of real files (directory files) registered in the file name field 121, a date-and-time field 123 for recording the date and time of file creation, an index field 124 for indicating the file starting position of the data block management table, as will be described in detail later, and file size field 125 for recording information on the size of real files. In a narrow sense, the fields 122, 123, 124 and 125 may be called together for their contents the "file management data" 128, or in a broad sense, the above data added by real file (directory file) names may be called the "file management data". In the attribute field 122, data "f" indicates that a file name is registered in the real file (directory file) name field 121, while data "d" indicates that a directory name is registered in it. In case of directory name registration, file size "0" is recorded in the file size field 125.

Referring next to FIG. 3, the data block management area 130 has a provision of a data block management table 139, in which are recorded directory files and/or real files registered in the data area in one-to-one correspondence. The data area 150 consists or numerous divided data blocks 159 with a proper capacity, and each data block 159 is identified using a specific index number.

The data block management table 139 comprises an index section 131 which sequentially stores index numbers of the data blocks 159 saved in the data area 150, and a linkage data section 132 which indicates the index number of a data block 159 when it has overflowed the data block indicated by the index section 131. The vacancy of the linkage data section 132 stands for the unused data block 159 with the index number indicated by the corresponding index section 131, while its occupancy by record "END" implies that data in the data block with the index number indicated by the corresponding index section 131 does not link to other data block 159. Namely, the location of a data block 159 within data area 150 in which directory files and/or real files are stored is expressed by the correspondence (chaining) between the index section 131 within data block management table 139 and the index number of the linkage data section 132.

The file management table 129 and data block management table 139 are related as follows. For example, the index field 124 with file name "FiLE01" registered in the file management table 129 contains "0001" which is the starting index of the data block corresponding to the file, and tracing index numbers in the data block management table 139 reveals that the file is made up of three data blocks 159 as indicated by index numbers "0001"→"0002"→"0003". A subdirectory "diR01" registered in the file management table 129 has a starting index number of "0015", and tracing index numbers in the data block management table 139 reveals that the subdirectory "diR01" is made up of a single data block 159.

Figure 4:
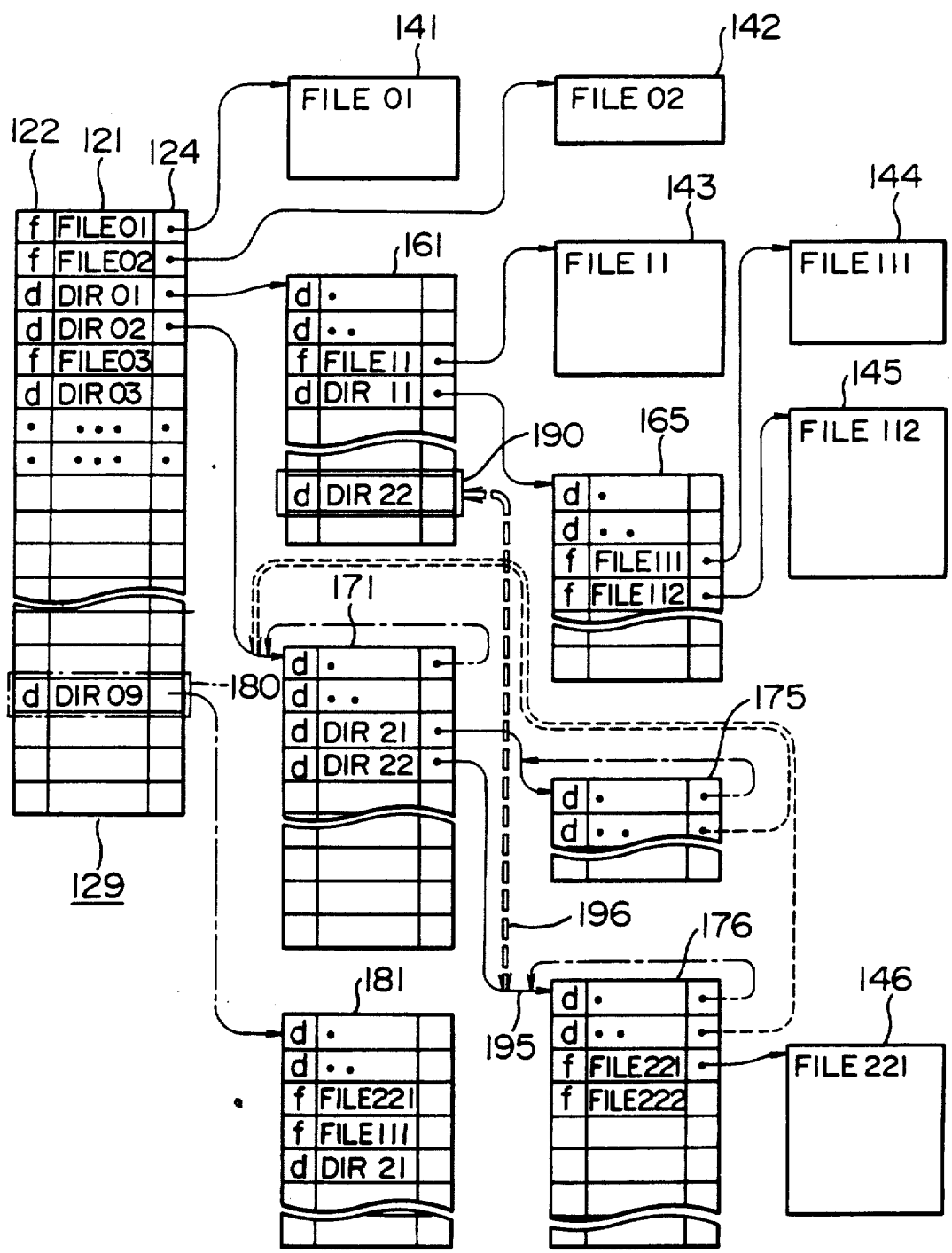
FIG. 4 is a diagram showing the relation between the directory files and real files according to an embodiment of this invention.

Referring to FIG. 4, a tree-structure file system is realized by treating the file management table, which indicates the contents of subdirectories, as a sort of file (which will be termed a "directory file"). In the directory file 161 which records the contents of subdirectory "diR01" stored in the file management table 129 in the root directory 120, there is provided a file management table similar in form to the file management table 129 of the root directory, as described above, in which are recorded the starting index number, etc. indicative of a real recording data block 159 such as file "FiLE11" which belongs to subdirectory "diR01" or lower-ranking subdirectory "dir11". The directory file 161 is headed by a record of subdirectory name "." indicative of the subdirectory "diR01" itself and of its starting index number, and it is followed by a record of the starting index number of the file management table in the root directory, i.e., the parent directory for the subdirectory "diR01", (The starting position of the file management table 129 in the root directory is determined in a fixed manner in most cases.). The directory file 165 stores a lower-ranking file management table, which indicates the contents of subdirectory "diR11", by which files "FiLE111", "FiLE112" and so on are managed.

Using the foregoing file management table and data block management table, a tree-structure file system as shown in FIG. 5 for example is organized.

Features of this invention will further be described. File management data for directory "diR22" with a record of the starting index number of the directory file 176 is stored in the directory file 171 of higher-ranking directory "diR02", and by copying file management data pertinent to the directory "diR22" into a directory file 161 of other subdirectory "diR01" for example, it becomes possible for the subdirectory "diR01" to make reference to a file "FiLE221" in the subdirectory "diR22". Namely, copying a series of file management data for the directory "diR22" inclusive of the directory name, as shown by 190 in the figure, into the file management table in the directory file 161 establishes a new directory connection 196 for a file "FiLE221", for example in the directory "diR22", besides the existing directory connection 195. Accordingly, a tree-structure file system with an added path as shown by the dashed line in FIG. 5 is re-organized without moving a real file "FiLE221" in the data area 150 of the storage.

Figure 6:
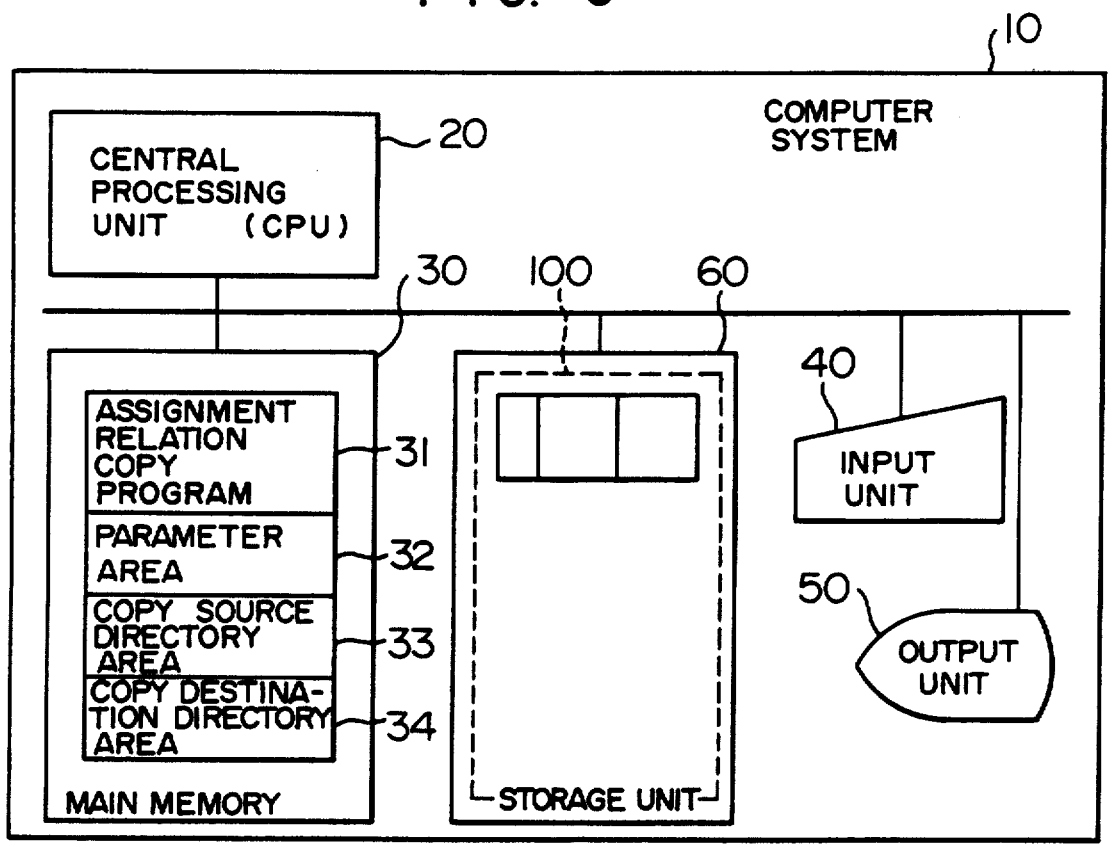
FIG. 6 is a block diagram showing the computer system according to an embodiment of this invention.

Next, the embodiment will be explained in more detail by adding FIGS. 6, 7 and 8. In FIG. 6, indicated by 10 is a computer system, which comprises primarily a central processing unit (will be termed "CPU") 20 for implementing various comparisons, decisions and computations in accordance with a program stored in a main memory 30, an input unit 40 such as a keyboard, an output unit 50 such as a CRT unit, and a storage unit (auxiliary memory) 60 including the aforementioned storage area 100. These units are interconnected by data buses and address buses. The main memory 30 further stores (loaded from the auxiliary storage) an assignment relation copy program 31, which constitutes the principal portion of this embodiment, and has allotments for a parameter area 32, copy source directory area 33, copy destination directory area 34, etc.

The assignment relation copy program 31 is initiated by a command, which is assumed to be LDiR (LiNK DiRECTORY). This command has the following format for example.

LDiR parameter(1) parameter(2) Parameter(1) specifies the name of a directory file (real file) to which a new linkage is established, and parameter(2) specifies the name of a directory which becomes the parent of that specified by parameter(1). The command "LDiR" is entered through the input unit 40, and the CPU 20 initiates the assignment relation copy program 31 to commence the copy operation for management data of directory files and/or real files in concern.

The copy operation will be described in detail sequentially with reference to FIGS. 7 and 8 for the case of an example in which a directory "diR22" is registered as a subdirectory of a directory "diR01" (re-definition of the directory "diR22" as a lower-ranking directory of the directory "diR01") as shown in FIGS. 4 and 5.

Upon issuance of the LDiR command: "LDiR ¥ diR02 ¥ diR22 ¥ diR01" on the input unit 40, the command interpreting program (e.g., it is activated following a key entry) initiates the assignment relation copy program 31. (Note: Symbol "¥" in the command is used for punctuating between a directory and subdirectory in the hierarchical relations in the tree-structure file system; a leading "¥" represents the root directory, while the absence of leading "¥" is the case of routing which begins at the current directory or subdirectory.) At the same time, the contents of parameter(1) and parameter(2) of the LDiR command are stored in the parameter area 32.

The assignment relation copy program 31 implements the parameter check in step 01 and following steps. In step 02, the program fetches parameter(1) and parameter(2) from the parameter area 32 and tests whether the directory or file specified by the parameters exist in the storage area 100. This process, when the parameter(1) and parameter(2) are based on the root directory, is accomplished by tracing from the root directory toward lower-ranking subdirectories. (Note: In the following discussion, the tree structure always has a connection from the highest-ranking root directory toward lower-ranking directory files, and it is called "the absolute position specification of subdirectories in the tree-structure file system") Parameter(1) is "diR02 ¥ diR22", and accordingly the contents of the file management table 129 of the root directory and the directory file 171 are examined. For "¥ diR01" of parameter(2), the file management table 129 of the root directory is examined. If the directory names of parameter(1) and parameter(2) are not detected in step 02, the next step 03 displays a message of improper parameter(1) or parameter(2), and transfer control to step 09 to terminate the LDiR command. When the parameters are detected normally in step 02, the next step 04 examines the contents of directory file 161 of the subdirectory "diR01" given as parameter(2) to test that the same subdirectory name or file name as the lowest-ranking subdirectory name or file name specified in parameter(1) is absent in the file management table of the directory "diR01". The tree-structure file system cannot be traced correctly if the same subdirectory name or same file name exits, and in such a case step 05 displays a message of improper subdirectory name on the output unit 50, and step 09 terminates the LDiR command. Step 06 tests the availability of a vacant area for additional recording in the storage area 100 of the storage unit 60. This is accomplished by detecting a vacant area in the linkage data section 132 of the data block management table 139 in the file management data area 130 described previously. If no vacant area is detected in the storage area 100, step 07 displays deficiency of vacant area in 100 on the output unit 50 and terminates the LDiR command. The parameter check process including the above preprocessings completes at step 08.

Subsequently, the assignment relation copy program 31 proceeds to command execution which begins with step 10. Initially, step 11 inhibits the entry of input specification (particularly, interrupt and abortion) on the input unit 40. Unless this procedure is taken, aborting the copy operation for file management data does not guarantee the matching between file management tables of each level or between file management tables and directory files or real files. Step 12 saves the current working environment in the working area of the main memory 30, and moves the working environment of the LDiR command to the subdirectories " diR0-2 diR22" specified by parameter(1) stored in the parameter area 32. As a result of movement of working environment, information pertinent to the directory file 171 of subdirectories "¥ diR02 ¥ diR22" (e.g., subdirectory name, file starting position, file size, etc.) is collected in the working area (not shown) of the main memory 30. The next step 13 reads the file management data indicative of subdirectory "¥ diR02 ¥ diR22" out of the file management table in the directory file 171 on the basis of the information collected in the preceding step 12, and stores it in the copy source directory area 33 in the main memory 30. Consequently, the copy source directory area 33 has a record of the attribute of real file (directory file), date and time of creation, file starting index number, file size, etc. from the file management table, as well as the subdirectory name "diR22". Subsequently, step 14 moves the working environment of the LDiR command to the subdirectory "¥ diR01" specified by parameter(2) recorded in the parameter area 32. As a result of movement of the working environment, information pertinent to the directory file 161 of subdirectory "¥ diR01" particularly information for updating the record of directory file) is collected in the working area of the main memory 30 by the usual method, as in the previous case. Subsequently, after step 15 has read the file management data in the copy source directory area 33 in the main memory 30 into the copy destination directory area 34, file management tables in the directory file 161 are re-edited in the copy destination directory area 34. On the basis of the information collected in the working area in step 14, step 15 reads the file management table in the directory file 161 into the copy destination directory area 34, and the file management data of the subdirectory "diR02" recorded in the copy source directory area is edited additionally. The next step 16 is to write the file management table edited in the copy destination directory area 34 into the storage area 100 of the storage unit 60 as a directory file 161. The step 16 traces the data block management table 139 in accordance with the information of directory "diR01" collected previously in the working area, and the new file management table for the directory "diR01" in the copy destination directory area 34 is recorded in the storage area 100 as a directory file 161. At this time, the file size of the directory file 161 is modified (increased), and if it exceeds the unit which is currently used by the data block 159 before re-editing, the chaining of index numbers in the data block management table 139 is also altered (e.g., if 0005 and 0006 do not suffice FiLE01 in FIG. 3, unused 0007 may be used next), and it is written into the data block management area 130 in the memory 60. Indicated by 190 is a subdirectory added in the directory file 161 by the operation of step 16.

Next, step 17 restores the working environment before command execution, which has been saved in the working area of the main memory 30, and enables the input unit 40. The command execution process ends in step 18, and the LDiR command completes in step 19.

By the LDiR command of this embodiment, the assignment relation copy program in the main memory 30 copies file management data of a subdirectory file or real file into the file management table of other directory file. Accordingly, the LDiR command enables the referencing of a subdirectory or real file by way of the subdirectory without accompanied by the movement or copying of directory files or real files in the storage area 100, and an intended tree-structure file system can be re-organized.

The foregoing embodiment is the case of extracting file management data of subdirectory "diR22" from the directory file 171 and copying it into another directory file 161. The following describes the case in which files "FiLE221", "FiLE222", etc. which belong to subdirectory "diR22" are copied into another directory. In this case, the LDiR command is expressed as follows, for example.

"LDiR ¥ diR02 ¥ diR22 ¥ diR01"

It is defined that if "¥" in the character string of parameter(1) is not followed by a subdirectory name or file name, a subdirectory or real file which belongs to the preceding directory file is copied into the subdirectory indicated by parameter(2). Then, the processes of step 12 and following steps explained on FIG. 8 can be carried out as follows for example. In step 12, the working environment is transferred to subdirectory "¥ diR02 ¥ diR22" specified by parameter(1), and at the same time information pertinent to a directory or file below the subdirectory "¥ diR02 ¥ diR22", i.e., information for making reference to the directory file 176 which stores the file management table of the subdirectory "diR22", is collected in the working area of the main memory 30. The next step 13 copies the contents of the file management table in the directory file 176 for the subdirectory "diR22" into the copy source directory area 33 in the main memory 30 on the basis of the information collected in step 12. The process of step 13 will be described in more detail. The assignment relation copy program 31 assigns a maximum possible area in the main memory 30 to the copy source directory area 33. The basis of this treatment is that the directory file for recording the file management table of a subdirectory does not have a unique size and the capacity needed by the copy source directory area 33 cannot determined in advance. After the copy source directory area 33 has been expanded in this manner, the contents of the file management table in the directory file 176 indicated by parameter(1) is written to the copy source directory area 33. Subsequently, the recording area of the copy source directory area 33 is checked, and the portion which has been assigned to the copy source directory area 33, but left unused, is released for other purpose. The next step 14 transfers the working environment to the subdirectory "¥ diR01" specified by parameter(2), and information pertinent to the subdirectory is collected in the working area of the main memory 30. The step 14 merges the contents of the file management table for the subdirectory "diR01" indicated by parameter(2) with the contents of the file management table which has been read into the copy source directory area 33. The process of step 14 will be described in more detail. The assignment relation copy program 31 first assigns a maximum possible area in the main storage to the copy destination directory area 34 for the same reason as mentioned previously. After a sufficient area for the copy destination directory area 34 has been reserved, the file management table recorded in the directory file 161 which indicates the contents of subdirectory "diR01" is written to the copy destination directory area 34. Subsequently, file management data including real file names (directory file names) which have been recorded in the copy source directory area 33 are added sequentially into the file management table. In this case, file management data pertinent to real file name (directory file name) "." and ".." which reside in the copy source directory area 33, indicative of the directory file 171 itself and root directory, respectively, does not need to be added in the copy destination directory area 34. After file management data have all been read out of the copy source directory area 33 into the copy destination directory area 34 the recording area of the copy destination directory area 34 is checked and the portion which has been assigned to the copy destination directory area, but left unused, is released for other purpose.

The next step 16 writes the new file management table which has been adjusted in the copy destination directory area 34 into the directory file 161 indicated by parameter(2). The chain of index numbers in the data block management table 139 is traced in accordance with the management information for directory "diR01" collected in the working area, and the new file management table is stored in the directory file 161 in the recording area 100. Subsequently, in the process of step 17 and following steps, the working environment which has been saved previously in the working area is restored, the input unit 40 is enabled, the parameter area 32, copy source directory area 33 and copy destination directory area 34 are released, and finally the area of the assignment relation copy program 31 itself is released to complete the LDiR command.

This embodiment makes it possible a direct referencing from subdirectory "diR01" to file "FiLE221" and "FiLE222" which have originally belonged to subdirectory "diR02", as shown by the dash-and-dot line in FIG. 5, while retaining the reference path from directory "diR22" to files "FiLE221" and "FiLE222".

In this embodiment, file management data for files "FiLE221" and "FiLE222" is defined double in the directory files 176 and 161 of the subdirectory "diR22", i.e., its parent directory, and subdirectory "diR01". Therefore, when a file "FiLE221" is referenced for writing accompanied by change in size, for example, some means is required to rewrite concurrently file management data (particularly the file creation date and time and file size information) in two file management tables which govern the file "FiLE221" so that the two file management tables retain the compatibility.

An example of such a means is the addition of the following function to the assignment relation copy program 31. File management tables in which a file is defined double by the LDiR command have their attribute revised from "f" to "F", for example, thereby indicating double definition. More specifically, files "FiL221" and "FiLE222" in the file management table in the directory files 176 and 161 have their attribute field altered to "F", and they are written into the directory files 176 and 161 in step 16 in FIG. 7 for example. In making reference to the files "FiLE221" and "FiLE222" again after the revision of attribute area, the attribute area is checked and, if it is found "F", the chain of index numbers in the data block management table 139 is traced on the basis of the index number recorded in the index area, and reading or writing necessary for the files is implemented upon confirmation (and updating) of the file size. This method enables double-defined real files to be referenced arbitrarily. A conceivable case is to read and write concurrently such a double-defined real file by way of both subdirectories, and the security of file is not guaranteed. In this case, a field is provided for prescribing the priority of reading or writing in both file management tables of the real file or for indicating the write inhibition for one access, so that the real file is read or written in accordance with the state of the field.

Figures 9, 10:
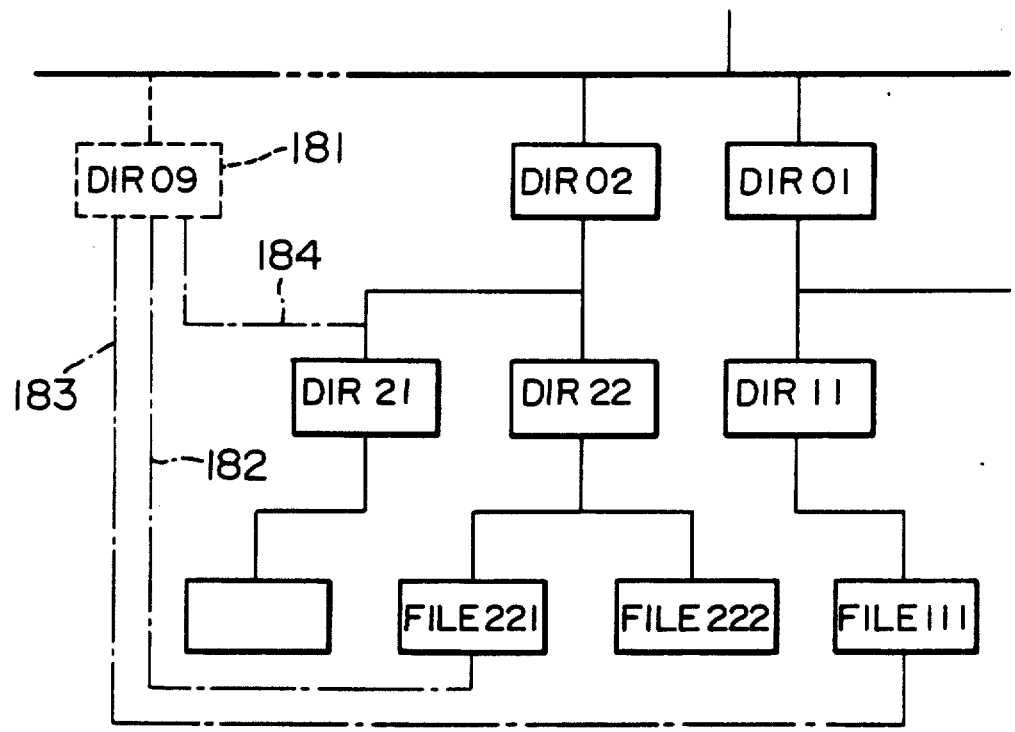
FIG. 9 is a diagram showing the arrangement of the double definition list according to an embodiment of this invention.
FIG. 10 is a diagram showing the tree structure of the directory files and real files according to another embodiment of this invention.

Another conceivable means of retaining the compatibility of two file management tables is a provision of a double definition list in which double-defined real files are registered. For example, the double definition list is a system file designed to record double-defined real files in file name beginning with the root directory sequentially on both sides of symbol "=", as shown in FIG. 9. The system file is registered with a file name "FiLE01" for example in the file management table 129 for the root directory. In the example of the preceding embodiment, each time files "FiLE221" and "FiLE222" are defined double, file names before and after double definition are recorded sequentially on both sides of symbol "=" in the absolute position specification based on the root directory in the double definition list. In consequence, double definition data "¥ diR02 ¥ diR22 ¥ FiLE221= ¥ diR01 ¥ FiLE221" is recorded for the double definition of file "FiLE221", and "¥ diR02 ¥ diR22 ¥ FiLE222= ¥ diR01 ¥ FiLE222" is recorded for file "FiLE222" in the double definition list. The END mark is placed at the end of the double definition list.

With the provision of such a double definition list, each time a real file is opened, the double definition list is referenced to check if the file is registered in the list. In case the file name is detected in the double definition list, the file name located on the other side of the detected file name with respect to the "=" symbol (in absolute specification based on the root directory) is recorded in a certain working area of the main memory 30. This preparatory process enables concurrent management for a plurality of file management table (in the directory file) in which information on opened files is recorded. Specifically, in opening a double-defined file "¥ diR01 ¥ FiLE221", the double definition list is searched for the file name to find a file "¥ diR02 ¥ diR22 ¥ FiLE221" linked by the "=" symbol, and it is recorded in the working area. Subsequently, from the file name "¥ diR01 ¥ FiLE221", not only the directory file 161 with a record of its file management data, but from the file name "¥ diR02 ¥ diR22 ¥ FiLE221" another directory file 176 is also read into the working area, and as the file "FiLE221" is written or closed, file management data pertinent to the file "FiLE221" of both directory files 161 and 176 is updated sequentially in the working area, and the updated file management tables are re-registered in the respective directory files 161 and 171.

By following the foregoing procedure, even if a file is defined double, the compatibility among a plurality of file management tables in which file management data of that file is recorded can be retained. Also in this case, as in the foregoing means, it is effective to rewrite the attribute field of the file management data for the double-defined file and make access to the double definition table only when the attribute is rewritten.

The foregoing means of retaining the compatibility among file management data in case of double definition of a real file, is equally useful in double-defining a subdirectory.

Next, another embodiment of this invention will be described with reference to FIGS. 10 and 11. Whereas the preceding embodiment is designed to make a linkage for other subdirectory or real file in an existing subdirectory, this embodiment is intended to make a linkage for an existing subdirectory or real file in a directory file which is newly created. For example, a new subdirectory "diR09" is newly created, and files "FiLE221" and "FiLE111" and a subdirectory "diR21" are placed below the new subdirectory. The LDiR command is given as "LDiR ¥ diR02 ¥ diR22 ¥ FiLE221 ¥ diR09" for example, and it means that when a new subdirectory name is specified in parameter(2), this new subdirectory is created and a subdirectory and/or real file specified in parameter(1) are linked to the created subdirectory.

Figure 7:
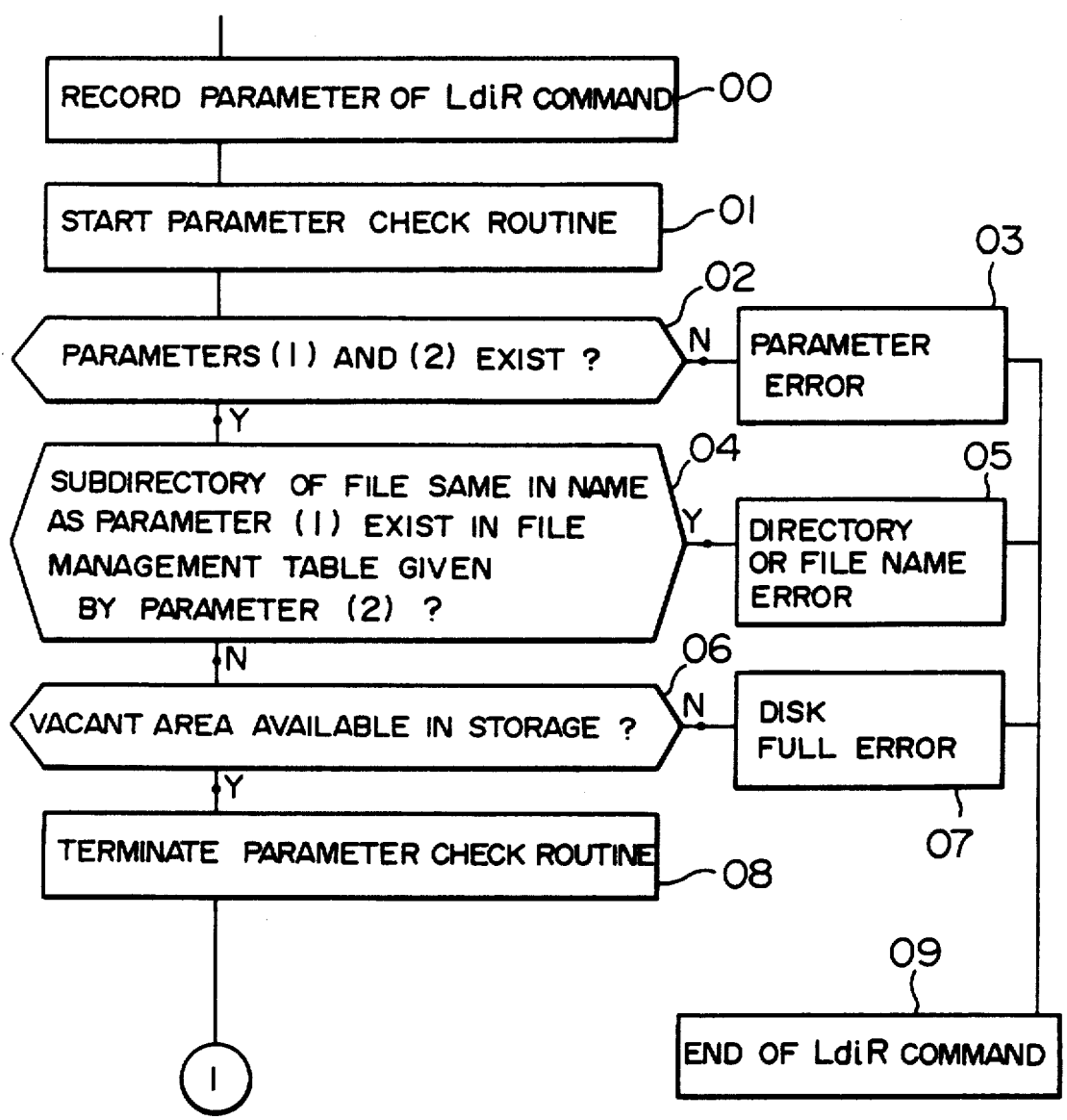
FIGS. 7 and 8 are flowcharts showing the operational sequence of the assignment relation copy program according to an embodiment of this invention.
Figure 8:
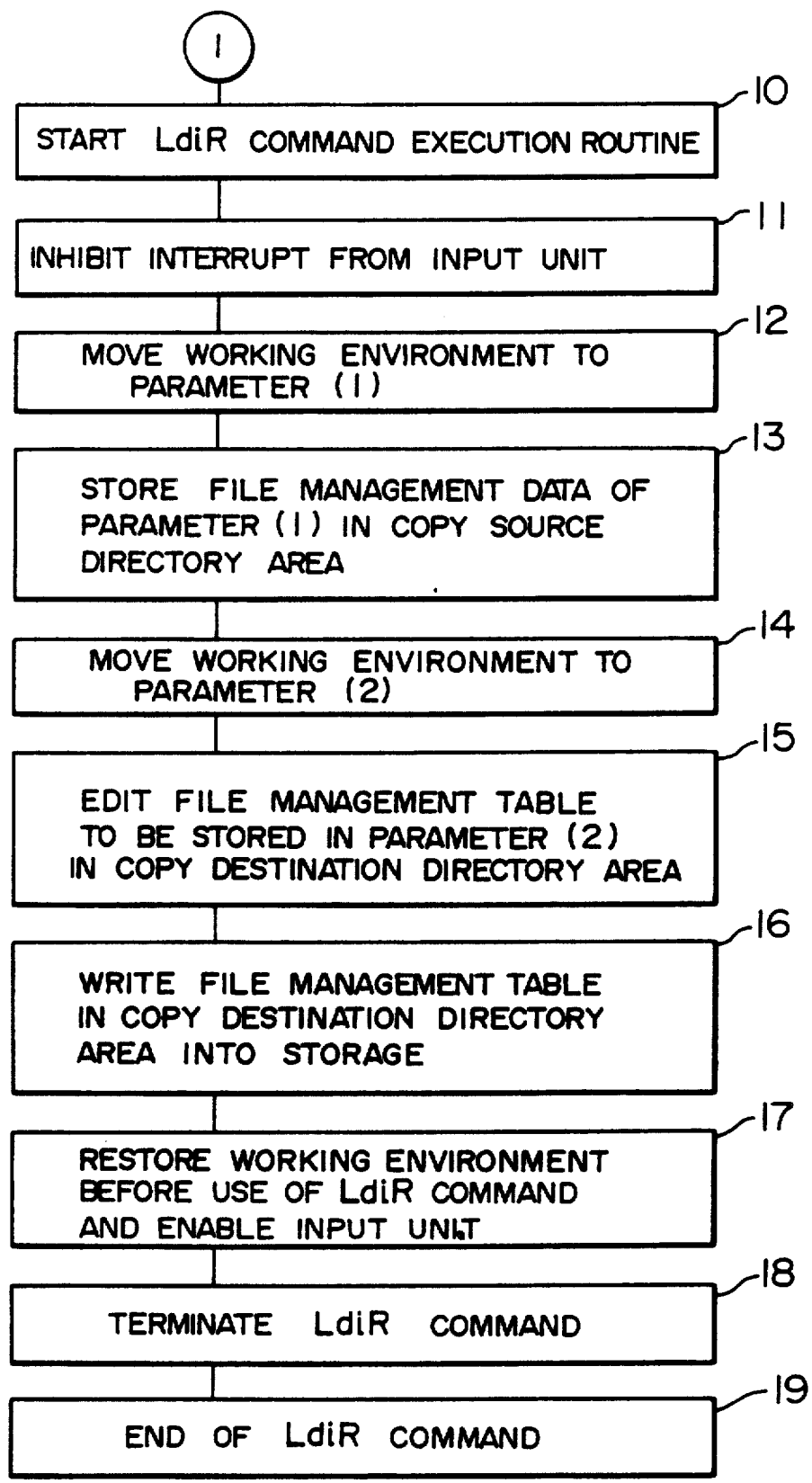
Figure 11:
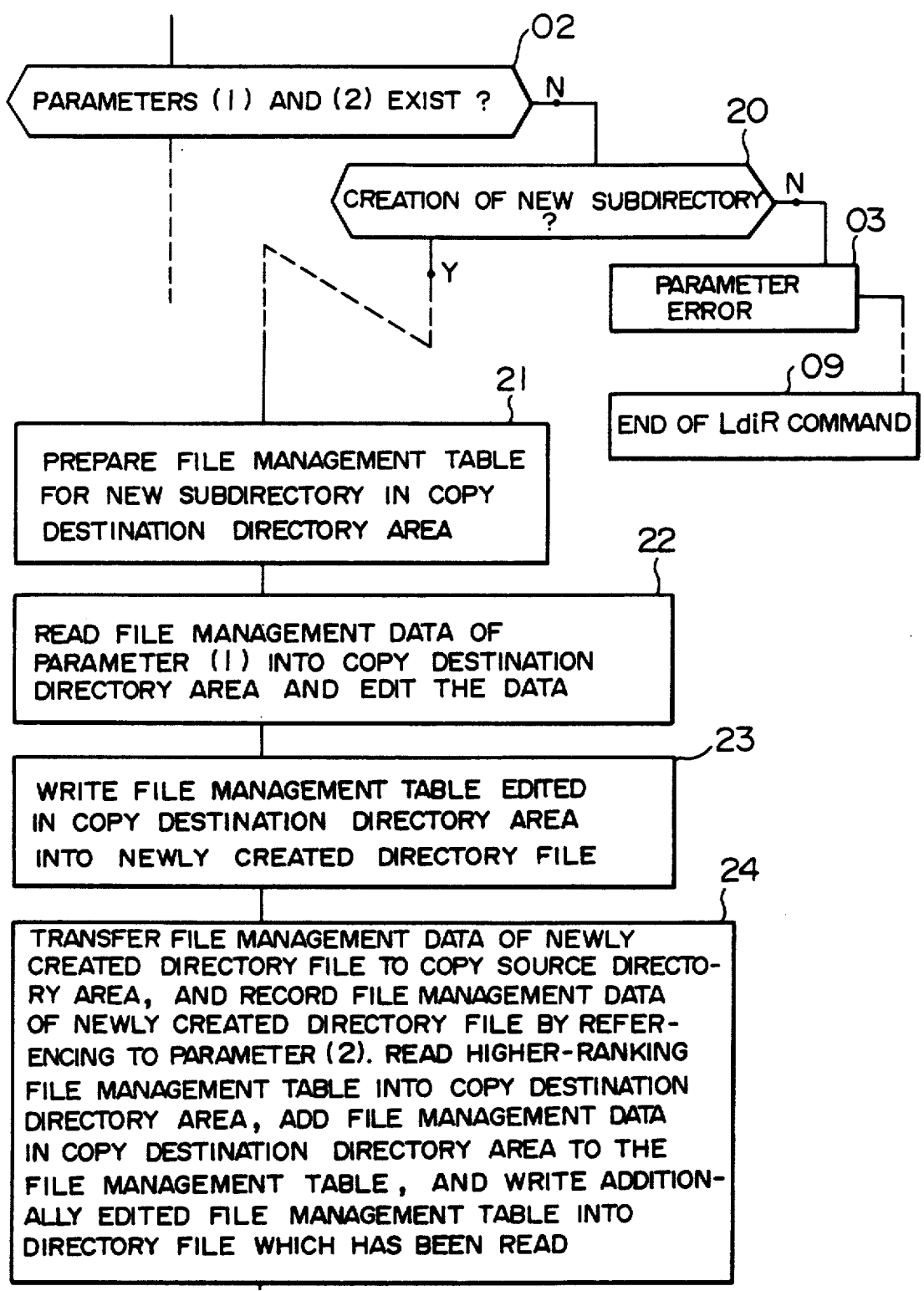
FIG. 11 is a flowchart showing the operational sequence of the assignment relation copy program according to an embodiment of this invention.

FIG. 11 shows in detail the characteristic portion of this embodiment, which is equivalent to step 02 and steps 14-16 explained on FIGS. 7 and 8. The processes before and after these steps are the same as the preceding embodiment, and explanation is not repeated here. If the assignment relation copy program 31 has detected in step 02 the absence of parameter(2) in the LDiR command, it is examined in step 20 through the operation of the output unit 50 and input unit 40 as to whether the subdirectory indicated by parameter(2) be newly created. If the step 20 makes a decision that a new subdirectory is not created, i.e., parameter(2) is improper, the LDiR command is terminated by the execution of step 09 as mentioned previously. If the creation of new subdirectory is decided, the former steps 04-13 are carried out sequentially, and then in step 21 a file management table for the new subdirectory "¥ diR09" is prepared in the copy destination directory area 34 in the main memory 30. The step 21 first checks a vacant area in the linkage data section 132 of the data block management table 139, and an index number indicative of the file starting position of the directory file 181 for writing the newly created file management table is reserved in the data block management table 139. The index number is recorded in the index area at the position for leading directory name "." in the file management table created in the copy destination directory area 34. Next, the step 21 checks the parent (higher-granted) directory of the subdirectory " diR09" to be created from the contents of parameter(2), examines the starting index number of the directory file in which the file management table of the parent directory is stored, and records it in the index area at a position of directory name ".." of the created file management table. Since in this embodiment the parent directory of directory "diR09" is the root directory, the starting position in the storage unit 60 is determined uniquely. The next step 22 reads the file management data of the file "diR02 ¥ diR22 ¥ FiLE221" indicated by parameter(1) collected in step 13 from the copy source directory area 33, and copies it into the file management table created in the copy destination directory area 34. Step 23 implements writing of the newly edited file management table as follows. The file management table edited in the copy destination directory area 34 is written as a directory file 181 into the storage unit 60 in accordance with the index number provided in the preceding step, while tracing the data block management table 139. At this stage, the relation between the newly created directory "¥ diR09" and the root directory is not yet established sufficiently, and it is necessary to re-edit the file management table 129 of the root directory in the next step 24. The step 24 transfers for saving the contents of the file management table in the copy destination directory area 34 to the copy source directory area 33, and reads the file management table of the root directory, which becomes the parent directory of the new subdirectory "diR09" created in the copy destination directory area 34. After the file management data for the subdirectory "diR09" saved in the copy source directory area 33 has been written to the copy destination directory area 34 and the file management table 129 of the root directory has been re-edited, the file management table 129 is written into the root directory area of the storage unit 60. By this series of processings, the file management data for referencing the directory file 181 of the subdirectory "diR09" created newly in the file management table 129 of the root directory is recorded as shown by 180 in FIG. 4. This enables the new directory "diR09" to make reference to the existing file "FiLE221" as shown by 182 in FIG. 10. After the new subdirectory "diR09" has been created, the following LDiR commands are executed as in the preceding embodiment.

"LDiR ¥ diR01 ¥ diR11 ¥ FiLE111 ¥ diR09"

"LDiR ¥ diR02 ¥ diR21 ¥ diR09"

Consequently, the file "FiLE111" and subdirectory "diR21" are collected below the subdirectory "diR90", and the real file or subdirectory in linkage can be referenced by way of the subdirectory "diR09" as shown by 183 and 184 in the figure. This embodiment is of course capable of establishing a new tree structure without being accompanied by the movement or copying of real files and directory files in the storage unit 60, as in the preceding embodiment.

Although in the foregoing embodiment file management data pertinent to directory names "." and ".." of a newly created file management table are collected in the early stage of step 21, this process may be conducted immediately before writing the file management data in step 23. Although the embodiment is the case of creating new subdirectories below the root directory, it is also possible to create new subdirectories below an existing subdirectory. Parameter(1) can specify not only file names, but also existing subdirectory names or real files and/or subdirectories which belong to a subdirectory, as in the above embodiment. Also in this embodiment, the means of retaining the compatibility among file management tables of double-defined real files and directory files, which has been explained in the former embodiment, is useful.

Although in the foregoing two embodiments parameter(1) and parameter(2) of the LDiR command have file names and directory names specified as absolute positions based on the root directory, they may be relative positions with respect to the working environment immediately before the command execution. In this case, data pertinent to the working environment before the command execution, which is saved after the command execution, is modified each time parameter(1) or parameter(2) is used before preceding to the following process. Although in the embodiment file management data pertinent to the self directory or parent directory are recorded in the directory file, these file management data may be created in a separate file (table) under management for their relationship.

Although in the embodiments the boot area 110, root directory area 120 and data block management area 130 are provided as fixed areas in the storage unit 60, they may be provided with variable area, and part of the areas may be placed in the main memory 30.

In this invention, if a double-defined subdirectory or real file is removed or deleted, it naturally becomes infeasible to make reference to the subdirectory or real file by tracing another tree structure. In such a case, a priority order is set in the tree structure of tracing subdirectories and real files, and in case of tracing a low-order tree structure, their removal or deletion is inhibited. The file management table where double-defined subdirectories and real files are recorded may be provided with an area for recording the indication of removal or deletion (or the attribute area is rewritten), so that referencing to the subdirectory or real file is inhibited in accordance with the information in the area. Removal or deletion of subdirectories or real files is suspended until information in all file management tables with records of double definition are consistent. In any case, a new tree structure can be added to an existing tree-structure file system without moving files and directories.

I claim:

1. A computer file system in which directory files and real files are organized in a tree structure comprising:
   a recording medium for storing the directory files and the real files;
   first and second high-order file management tables stored in respective high-order directory files which occupy high-order positions in the tree structure;
   low-order directory files and real files occupying positions below the high-order directory files in the tree structure, said first and second high-order file management tables each storing file management data indicative of a storage assignment between data items written in a high-order directory file and at least one of the low-order directory files and real files occupying positions below the high-order directory files;
   first and second low-order file management tables stored in respective low-order directory files for storing file management data indicative of a storing assignment between data items written in the low-order directory file in which said first or second low-order file management table is stored and at least one of the real files and the low-order directory files other than the low-order directory file in which said first or second low-order file management table is stored;
   input means for designating first file management data in at least one of said first high-order file management table and said first low-order file management table and for designating second file management data in at least one of said second high-order file management table and said second low-order file management table;
   a copy source file management table for storing said second file management data designated by said input means;
   a copy destination file management table for storing said first file management data designated by said input means;
   edit means for editing said file management data of at least one of said first high-order file management table and said first low-order file management table in said copy destination file management table by copying said second file management data from said copy source file management table into said copy destination file management table; and
   write means for writing the first file management data edited by said edit means in a memory area in said recording medium at the position at which said file management data was stored prior to editing in one of said high-order management table and low order management table.

2. A computer file system according to claim 1, wherein, if neither a directory file name nor a real file name in one of said second high-order file management table and second low-order file management table as specified by said input means in said second file management data exists in the one of said first high-order, file management table or said low-order file management table, said assignment relation copy means copies file management data of one of said second high-order and second low-order file management table into file management data of one of said first high-order file management table and said first low-order file management table.

3. A computer file system according to claim 1, wherein said edit means includes assignment relation copy means which, before and after copying of file management data of one of said first high-order and first low-order file management tables, records an indication of a relation between a high-order directory file and a low-order directory file, into a parameter recording area in said system.

4. A computer file system according to claim 3, wherein said assignment relation copy means records, into a pertinent data item of a file management table of one of said first high-order and first low-order file management tables which is stored in said copy destination file management table, information that the pertinent data item has been edited.

5. A computer file system according to claim 1, wherein said assignment relation copy means copies file management data indicative of a storage assignment relation between one of said first high-order file management table, said first low-order file management table, and said real files into a file management table of one of a newly created high-order file management table and a newly created low-order file management table written under control of said assignment relation copy means in said recording medium.

6. A computer file system according to claim 5, wherein said assignment relation copy means creates said newly created directory file in a position in said tree structure below at least one of a second high-order directory file and a second low-order directory file.

7. A computer file system according to claim 5, wherein said assignment relation copy means records a storage relation corresponding to one of a directory name and a real file name which expresses a position in said tree structure of one of a directory file and a real file identified by said directory name and real file name, respectively, before and after copying of file management data of said directory file and a real file as a directory connection of a high-order file management table in a parameter area in said system, and records an indication that file management data has been copied in a file management table of one of a directory file and a real file.

8. A computer file system according to claim 1, further comprising assignment relation copy means for controlling the copying of second file management data from said copy source file management table into said copy destination file management table.

9. A computer file system according to claim 8, wherein said edit means includes assignment relation copy means, and said assignment relation copy means reads file management data in a second high-order or low-order file management table of one of said high-order directory and said low-order directory, respectively, into said copy source file management table, reads file management data in a first high-order or low-order file management table of one of said high-order directory and low-order directory, respectively, into a copy destination file management table, edits file management data read into said copy source file management table which is added to file management data of said copy destination file management table, and writes an edited file management table from said copy destination file management table into one of said first high-order directory and said first low-order directory.

10. A computer file system according to claim 9, wherein said assignment relation copy means copies all of file management data in a file management table of one of said first high-order and first low-order file management table into said copy destination file management table and edits the copied file management data with file management data of one of said second high-order file management table and second low-order file management table residing in said copy source file management table.

11. A computer file system according to claim 8, wherein said assignment relation copy means copies file management data in a first high-order or low-order file management table of one of said high-order and low-order directory files into a file management table of a newly created directory file written under control of said assignment relation copy means in said recording medium.

12. A computer file system according to claim 11, wherein said assignment relation copy means creates said newly created directory file in a position in said tree structure below one of a second high-order directory file and a second low-order directory file.

13. A computer file system according to claim 11, wherein said assignment relation copy means records a storage relation corresponding to one of a directory name and a real file name which expresses a position in said tree structure of a one of a directory file and a real file identified by said directory name and real file name, respectively, before and after copying of file management data of said directory file and a real file as a directory connection of a high-order file management table in a parameter area in said system, and records an indication that file management data has been copied in a file management table of one of a directory file and a real file.

* * * * *